Figure 1:
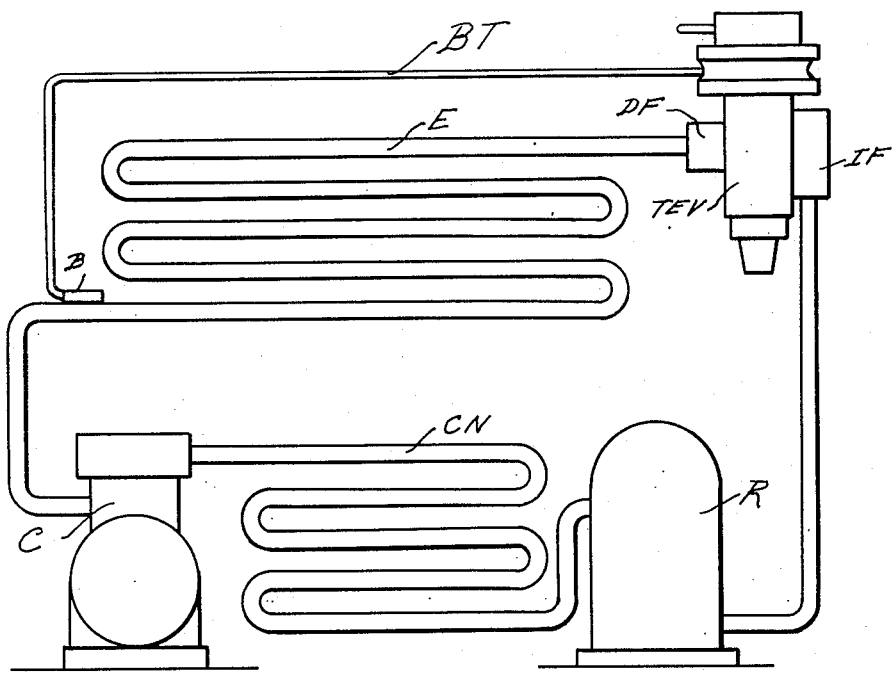

Aug. 22, 1950        H. T. LANGE        2,519,483
FLUID-POWERED VALVE

Filed Aug. 30, 1946        2 Sheets-Sheet 1

INVENTOR:
HAROLD T. LANGE,
BY
Robert B. Terry
ATTORNEY

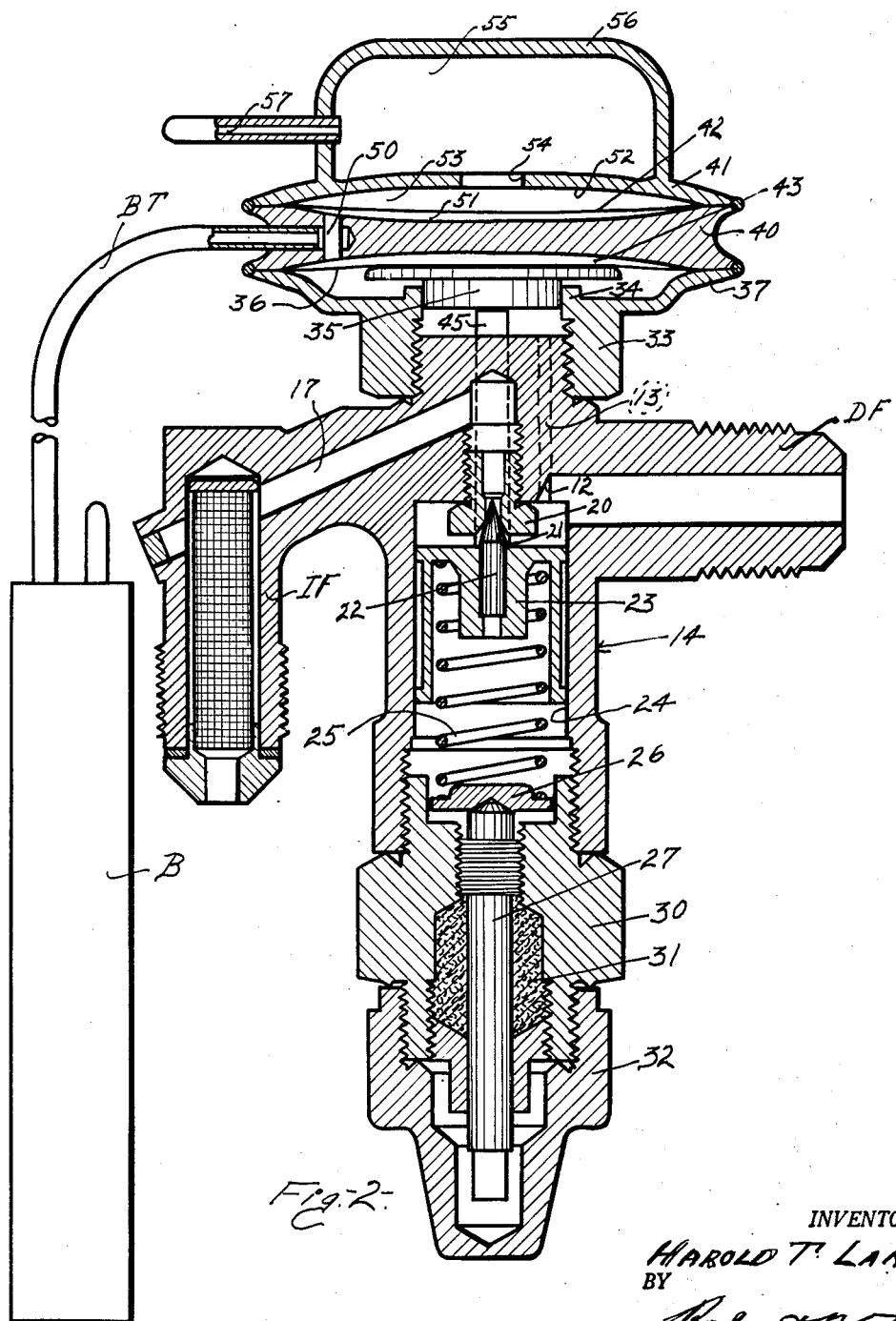

Patented Aug. 22, 1950

2,519,483

UNITED STATES PATENT OFFICE 2,519,483

FLUID-POWERED VALVE

Harold T. Lange, Webster Groves, Mo., assignor to Sporlan Valve Company, St. Louis, Mo., a corporation of Missouri Application August 30, 1946, Serial No. 693,974

3 Claims. (Cl. 236—92)

This invention relates to improvements in fluid-powered valves, and more particularly to liquid-actuated valves, particularly but without restriction, thermostatic expansion valves for use in compressor - condenser - evaporator systems. The present improvements when utilized in a refrigerating system, result in a device providing an automatic load limiting function.

Thermostatic expansion valves used in refrigerating systems of the type noted, may be broadly divided into the so-called liquid-charged and gas-charged types. A liquid charged valve possesses an advantage in that the temperature of the valve power element does not materially affect its operation, and the temperature of the bulb or sensitive element is the controlling condition. On the other hand, liquid charged valves possess a distinct and recognized disadvantage in that they permit an abnormally high evaporator pressure during the pulldown period, and thus frequently overload the compressor prime mover, usually an electric motor. The gas-charged valve will generally satisfactorily limit suction pressures, but the valve must be so located and constructed that the temperature of the power element always exceeds that of the feeler bulb or sensitive element. This obviously introduces considerable difficulty, in that failure to maintain this temperature differential will cause the expansion valve to remain closed until the power element is warmed by external means. Thus in recognition of the generally more desirable characteristics of the liquid-charged valve, the present invention objectively combines the advantages of both types of charge, in utilizing a liquid-charged power element, but providing a separate cell charged with a gaseous fluid, for the purpose of limiting suction pressure, hence evaporator load.

A further object of importance arising from use of the present design, is attained in a simple low-cost device which may be produced, sold and applied as an article of manufacture, to thermostatic expansion valves of existing orders and types, or optionally, may be initially built into valve assemblies designed therefor, and for certain fields of usage other than in refrigerant installations.

A still further and valuable object of the invention is attained in a valve actuating means or attachment which provides, under certain valve operating conditions, the function of automatic limitation of valve actuating pressures, while under other conditions of operation, to meet optimum requirements, the unit or attachment may function in a more or less conventional manner within a more moderate range of valve actuating pressures.

Succinctly stated in reference to refrigeration applications, the improvements objectively attain a low-cost, positive means providing a definite restriction of evaporator pressures, hence loads, to any reasonable predetermined maximum.

The foregoing and numerous other objects will more clearly appear from the following detailed description of a presently preferred embodiment of the attachment, and functional combinations therewith, and from the drawings, in which:

Fig. 1 is a schematic flow diagram of a compressor-condenser-evaporator system such as may be used for comfort cooling or for refrigeration, and in which the present improvements are embodied, and Fig. 2 is a vertical sectional elevation, drawn on a somewhat larger scale than Fig. 1, and showing the details of a thermostatic expansion valve equipped with present improvements.

The subject matter of the present application is somewhat akin in purpose to that of a co-pending application of the same applicant, filed concurrently herewith, bearing Serial No. 693,973, and entitled "Improvements in Load Limiting Means for Use with Refrigeration and Other Valves."

Referring now by characters of reference to the drawing, and first to Fig. 1, a typical system in which the present improvements may be installed, includes a compressor C discharging into a condenser CN which in turn delivers liquid refrigerant into a receiver R. As in usual practice the receiver R communicates through the usual tubing in a closed refrigerant circuit, with the inlet fitting IF of a thermostatic expansion valve TEV. The discharge fitting DF of valve assembly TEV, supplies an evaporator E, the final pass or tube of which is suitably connected through the suction line back to compressor C. As thus far described, the system is or may be of conventional order and type, and may be considered as installed either for refrigeration in the restricted sense, or for comfort cooling purposes. As indicating either or any such usage in a broad sense, the system will be generally herein referred to as a cooling system, irrespective of specific field of usage.

The conventional system thus far described is modified, as through a port located at 12, and communicating through a bore 13 with the space immediately below the diapragm assembly, as will later hereinafter appear.

As in usual practice, a thermally responsive fluid-filled bulb B is located substantially as shown near the outlet of the evaporator E, so as to be responsive to refrigerant temperature in this zone, and communicates with a space or chamber above the diaphragm assembly of the thermostatic expansion valve later more fully described, as through a line of tubing BT. Such a connection is, of itself, well known in the operation of conventional thermostatic expansion valve assemblies.

Referring now more particularly to the thermostatic expansion valve assembly per se, as best shown by Fig. 2, this unit includes a body 14 provided with the inlet fitting IF and a discharge fitting DF of any suitable form. Within the body is formed a liquid passage 17 directed into a bore just above a threaded plug 20, the latter being provided with an axial passage, the lowermost portion of which is flared and lapped or otherwise finished to form a valve seat 21, on and off of which operates the valve pin element 22 provided with a cone or needle seating portion, substantially as shown. The valve pin 22 is carried by a pin holder 23 slidably associated with and guidedly engaged by the wall portions defining a finished cylindrical bore 24. The pin holder 23 is formed so as to receive a valve return spring 25 the lower or innermost end of which is seated upon a saddle 26, the saddle being centrally supported by a threaded adjusting element 27 engaging internal threads in the upper portion a threaded closure plug 30, the element 27 being suitably packed as indicated at 31, and its projecting end protected by a sealing closure 32.

The opposite end of the body 14 is externally threaded and is surmounted by an internally threaded closure 33, an upper portion of which is provided with an annular portion 34 peripherally embracing and guiding a buffer plate 35. The buffer plate constitutes a central backing element for a a diaphragm such as 36, the diaphragm being peripherally gripped and sealed by and between a flared housing element 37 and a disc or plate forming a second housing element 40, as will appear from Fig. 2. The diaphragm 36 and the housing element 40 form a chamber of varying size, indicated at 43.

An outer closure for the diaphragm casing is of generally circular form, outwardly convex, and is indicated at 41, while between the elements 40 and 41 is peripherally gripped and sealed a second flexible diaphragm 42 above which there is normally a chamber of varying size, indicated at 53.

Assuming for the present that movement be imparted to the diaphragm 36 and buffer plate 35 incident to thermal change in the content of the bulb B and tubing BT as well as chamber 43, such movement of the buffer plate may be transmitted to the pin holder 23 through a pair or more of push rods, one of which is shown at 45, a companion such rod being identical but not shown. The push rods serve operatively to transmit the motion of the buffer plate 35 directly to the pin holder 23, hence to the valve pin 22. The push rods are at all times kept under some degree of compression, since they are subject to the opposite pressures of the valve spring 25 and the diaphragm 36 and buffer plate 35.

A thermostatic expansion valve as thus far described, with the exception of the second diaphragm and the annular casing or housing element 40, is or may be identical with the type "G" expansion valves produced and sold by Sporlan Valve Company of St. Louis, Missouri, this description being introduced for completeness but without restriction to this particular design or type of valve assembly.

The present improvements by virtue of which a controlled action of the thermostatic expansion valve element 22 takes place under the influence of the fluid motor identified with the bulb B, and the opposing pressures derived in part from the valve spring 25, and in further part, from the equalizer passage 13 communicating with the refrigerant flow circuit, will now be described.

As to the structure and function of those elements which more particularly characterize the present invention by way of example, it is felt that the improvements will be better understood and appreciated if it first be noted that in the more or less conventional structures employing a single diaphragm, such as 36, the bulb tubing BT is connected into a chamber directly above the diaphragm. From this it results that, heretofore prevalently, the diaphragm is directly subjected to the pressures resulting from expansion of the liquid in the bulb, bulb tubing and the single diaphragm chamber due to superheat reflected at the evaporator outlet.

To such structure may be added, and there may be sold as an article of manufacture, an assembly of units consisting of a housing or disc element 40, a second diaphragm 42, and the chambered structure 41 thereabove. Both diaphragms as will be understood, are peripherally metallically sealed, diaphragm 36 between elements 37 and 40, and diaphragm 42 between elements 40 and 41. The disc or plate element 40 in the present structure is provided with a transverse bore or passage 50 which is in communication with the bulb line BT through the bore 50. The motor fluid, a liquid for example, is in communication with the space between diaphragms 36 and 42, which with the disc 40, enclose a variable volume cell or chamber including the space 43, and a space 51. The shape of the disc element 40 is approximately as shown, being of double concave aspect, and thus serving to limit the approaching or converging movement of the diaphragms 36 and 42. Movement of diaphragm 36 against the buffer plate 35 is limited by the engagement of the latter with the annulus 34 on member 33. Similarly, outward movement of diaphragm 42 is limited by an internally concave seat 52 on the element 41.

On the opposite or outer side of diaphragm 42 is a space or chamber 53 communicating through a large opening 54, with an outer space 55, provided by a dome-like integral extension 56 of member 41. The dome 56 is provided with a charging connection 57 for a purpose hereinafter more fully appearing.

It will have been observed that the chambers or spaces 53 and 55 are in continuous communication at all times through the port 54. Prior to putting the attachment or the valve into service, the combined space 53—55 is charged to a predetermined pressure with a gaseous fluid, which may consist of compressed air. Such air or other fluid may be inserted through the charging tube 57, which upon attainment of the requisite charge is sealed off. Since the diaphragm 42 as well as diaphragm 36 are securely peripherally welded or otherwise fastened to the adjacent metal elements, the fluid charge referred to will be practically permanently retained.

Assuming the expansion valve assembly with present improvements to be connected into the system, for example as illustrated, when the plant is first started, the load to be refrigerated is warm, thus resulting in a relatively high temperature and pressure of the refrigerant in the evaporator E, resulting in an abnormal load on the compressor prime mover, such as a motor. The present improvements serve to limit the evaporator pressure in the following manner:

The air pressure in chamber 53 is fixed at the predetermined charging pressure, for example, 15 lbs. p. s. i. gauge. This causes diaphragm 42 to be urged against disc 40 as long as the pressure in the bulb B, remains less than 15 lbs. Under these conditions, the volume of the space 43 is virtually the only volume which exists in the head of the valve assembly. This volume is intentionally less than the volume of bulb B. Even though the space 43 be at a lower temperature than that of the bulb B, and becomes filled with the liquid derived from the bulb charge, there will still remain a substantial volume of liquid in the bulb. Thus, under these conditions the valve 22 will still respond to the temperature of the bulb, which is desirable for normal operation. It is obvious that the volume of the space 43 will vary when the diaphragm 36 moves from valve-closed to valve-open position, but when this chamber or space is at its maximum volume, as in the fully open valve position, there still remains sufficient liquid in bulb B, for a normal and proper regulation of refrigerant flow.

Assuming now that the temperature of the bulb becomes abnormal, for example, at times during a pulldown period, and such that bulb pressure exceeds the 15 lb. value stated by way of example, then the diaphragm 42 is urged away from the disc 40, outwardly or toward the stop 52. This, now obviously, serves to enlarge the space 51 beneath the diaphragm 42, which space it will be assumed, was originally of zero volume. It now appears that the liquid which was contained in bulb B and in chamber or space 43, now may occupy a considerable additional volume represented by the augmented space 51, into which the liquid can flow. Inasmuch as the control or motor liquid will always flow into the space of lowest temperature, it will now fill the spaces 43 and 51. The amount of liquid charge in the bulb and communicating spaces is so gauged at the time of initial charge that when both spaces 43 and 51 are available, and at a lower temperature than the bulb, all of the liquid can and will leave the bulb. At this time the pressure in this system will tend to diminish to that pressure value corresponding to the current temperature of the parts enclosing the spaces 43 and 51, thus tending to close or somewhat restrict the expansion valve port 21 and thus to reduce the suction pressure. When this occurs, the volume of space 51 will be reduced, and some liquid will return to the bulb B. This trend is materially supplemented by the resulting reduction of volume of chamber 51. The same effect will obviously occur when the bulb pressure drops. Expectedly, of course, the bulb pressure and hence the pressure in chambered spaces 43 and 51, will again rise somewhat.

The resulting opposing forces will tend to create a balance of pressures between the 15 lb. fluid pressure in chamber 53—55, and the pressure in the bulb B and chambers 51—43. Such balance will be maintained at some suction pressure less than the predetermined maximum, being a pressure somewhat less, in the present example, than 15 lbs., and which will be the bulb pressure less the pressure of the valve return spring 25.

It now becomes apparent that the charged air cell of variable volume, identified with diaphragm 42 and chambers 53 and 55, will serve to limit the suction pressure to some value less than 15 lbs. during conditions of abnormal bulb and evaporator temperatures, and yet will permit the valve to operate normally, through a normal range of evaporator pressures and operating conditions.

It is now obvious that the present arrangement will function more efficiently when there is a correct proportion between the volume of the liquid thermostatic charge, and the total volume of the chambers or spaces 43 and 51. This is necessary in order that, when space 51 is at a maximum, the two spaces 43 and 51 are able to receive the entire thermostatic liquid charge. It is also indicated that the charge of air or other anhydrous gaseous fluid in chamber 53—55, be charged at a pressure somewhat higher than the maximum suction pressure desired.

It will have been observed that the results described are attained without the addition of any moving elements to thermostatic valves of more or less standard construction, the sole exception being the added diaphragm 42. This latter being without direct mechanical operating connection to the valve or any other element, the arrangement conduces to simplicity of structure, low cost and long life.

It will now have appeared that the combination, as well as the attachments described, are susceptible of usage in a wide variety of fields wherein motor valves of fluid-actuated type may be employed, all in full attainment of the several objectives above expressed.

Because of the many structural variations possible within the scope of the claims and full intended spirit of the invention, the detail of description given should be understood as instructive rather than limiting, except of course within the fair scope of the claims hereunto appended.

I claim as my invention:

1. As an article of manufacture, an attachment for connection between a thermally responsive fluid-filled bulb and associated tubing and an expansion valve of a compressor-condenser-evaporator system, the attachment including a closure for detachable mounting on the expansion valve, a disc element secured to said detachable closure, a second closure secured to said disc element at the side opposite the detachable closure, the closures and disc element defining chambers therebetween and at opposite sides of the disc element, diaphragms secured one in each such chamber and extending thereacross to define inner spaces adjacent the disc element and outer spaces adjacent said closures, said disc element having passage means therein interconnecting with said inner spaces and with the fluid-filled bulb and associated tubing, the outer space between said second closure and an adjacent diaphragm being charged with an isolated gaseous fluid, and a buffer plate operatively mounted in the outer space adjacent said detachable closure for movement responsive to the motion of the adjacent diaphragm, said buffer plate being in motion transmitting relation to the expansion valve.

2. As an article of manufacture, a fluid motor-actuating attachment for an expansion valve, the attachment including a disc element formed with opposite concave faces and motor fluid passage means extending through the element to open at each concave face and at the periphery thereof, a diaphragm extending across each of the concave faces of said element to form a sealed cell therebetween for receiving the motor fluid, the respective concave faces of said element serving to limit the approaching movement of the diaphragms, and a pair of closures secured to said disc element at its opposite faces to retain the respective diaphragms in position, one of said closures providing with the adjacent diaphragm a second sealed cell adapted to contain an isolated charge of a gaseous fluid, and the other said closure being formed with an extended portion adapted for detachable connection with the expansion valve.

3. As an article of manufacture, a fluid motor-actuating attachment for the expansion valve of a compressor-condenser-evaporator system, the attachment including a disc element having opposite concave faces, a pair of diaphragms positioned one across each concave face of said disc element to form a pair of chambers, a closure mounted on said disc element in position to secure an adjacent one of said diaphragms to the disc element and forming with such diaphragm a sealed cell for holding an isolated charge of a gaseous fluid at a predetermined fixed pressure, a second closure mounted on and securing the other said diaphragm to the disc element, said second closure being formed with an extended portion for detachable connection with the expansion valve, said disc element having passage means opening between said pair of chambers and affording a connection between each of such chambers and the actuating fluid motor, and a buffer plate slidably disposed in the extended portion of said second closure for transmitting movement between the adjacent diaphragm, said buffer plate being in motion transmitting relation to the valve.

HAROLD T. LANGE.

REFERENCES CITED

The following references are of record in the file of this patent:

UNITED STATES PATENTS

| Number | Name | Date |
|---|---|---|
| 553,077 | Sheils | Jan. 14, 1896 |
| 1,969,652 | Larkin | Aug. 7, 1934 |
| 2,272,250 | Persons | Feb. 10, 1942 |
| 2,399,088 | Andrews | Apr. 23, 1946 |
| 2,404,596 | Roche | July 23, 1946 |